(12) United States Patent
Bates et al.

(10) Patent No.: US 11,526,282 B2
(45) Date of Patent: Dec. 13, 2022

(54) SECURE WIRELESS DATALOADING USING IN-FLIGHT ENTERTAINMENT CONNECTIVITY SYSTEMS

(71) Applicant: Panasonic Avionics Corporation, Lake Forest, CA (US)

(72) Inventors: Steven Bates, Mission Viejo, CA (US); Philip Watson, Lake Forest, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 355 days.

(21) Appl. No.: 16/780,538

(22) Filed: Feb. 3, 2020

(65) Prior Publication Data
US 2021/0240365 A1 Aug. 5, 2021

(51) Int. Cl.
| | | |
|---|---|---|
| *G06F 3/06* | (2006.01) |
| *H04B 7/185* | (2006.01) |
| *H04N 21/214* | (2011.01) |
| *B64D 43/00* | (2006.01) |
| *H04L 9/12* | (2006.01) |
| *H04L 9/40* | (2022.01) |
| *H04L 9/06* | (2006.01) |
| *H04W 88/08* | (2009.01) |

(52) U.S. Cl.
CPC .......... *G06F 3/0623* (2013.01); *B64D 43/00* (2013.01); *G06F 3/0637* (2013.01); *G06F 3/0673* (2013.01); *G06F 3/0683* (2013.01); *H04B 7/18506* (2013.01); *H04L 9/0631* (2013.01); *H04L 9/12* (2013.01); *H04L 63/0428* (2013.01); *H04L 63/0435* (2013.01); *H04N 21/2146* (2013.01); *H04L 2463/041* (2013.01); *H04W 88/08* (2013.01)

(58) Field of Classification Search
CPC ....... H04B 7/18506; H04B 3/56; H04L 67/12; H04L 9/0637; G06F 8/65; G06F 3/0623; G06F 3/0637; G06F 3/0673; G06N 5/046; B64D 43/00; H04N 21/2146; H04N 21/8166; H04W 88/08; B64F 5/40
See application file for complete search history.

(56) References Cited

U.S. PATENT DOCUMENTS

| | | | |
|---|---|---|---|
| 2002/0111720 A1 | 8/2002 | Holst et al. | |
| 2007/0027589 A1* | 2/2007 | Brinkley | G08G 5/0013 701/3 |
| 2013/0024727 A1 | 1/2013 | Frayssinges et al. | |
| 2013/0305238 A1* | 11/2013 | Frayssignes | G06F 8/65 717/173 |

(Continued)

*Primary Examiner* — Vinncelas Louis
(74) *Attorney, Agent, or Firm* — Perkins Coie LLP

(57) ABSTRACT

Devices, systems and methods for enhancing aircraft maintenance are disclosed. An exemplary method for improving dataloading in an airplane includes retrieving, from an in-flight entertainment connectivity (IFEC) system, at least one avionics software, the IFEC system comprising a mass storage device comprising a first storage segment and a second storage segment, the first storage segment being a secure storage segment configured to store the at least one avionics software, and the second storage segment being configured to store media content, and loading, using a wireless network converter coupled to a wired legacy port, the at least one avionics software onto a target avionics system.

23 Claims, 7 Drawing Sheets

(56) References Cited

U.S. PATENT DOCUMENTS

| | | | |
|---|---|---|---|
| 2014/0157005 A1* | 6/2014 | Leventhal | H04L 9/0637 |
| | | | 713/193 |
| 2018/0027037 A1* | 1/2018 | Watson | H04L 67/12 |
| | | | 709/219 |
| 2019/0012853 A1 | 1/2019 | Scholten et al. | |
| 2019/0098506 A1* | 3/2019 | Avila | H04B 7/18506 |
| 2020/0067789 A1* | 2/2020 | Khuti | G06N 5/046 |
| 2020/0106481 A1* | 4/2020 | Mitchell | H04B 3/56 |

* cited by examiner

US 11,526,282 B2

SECURE WIRELESS DATALOADING USING IN-FLIGHT ENTERTAINMENT CONNECTIVITY SYSTEMS

TECHNICAL FIELD

This document is directed generally to enhancing aircraft maintenance.

BACKGROUND

Routine aircraft maintenance is performed to ensure the continuing airworthiness of an aircraft or aircraft part, including overhaul, inspection, replacement, defect rectification, compliance with airworthiness directives and repair. In modern aircrafts, software running on computers is often used to control critical functional aspects of aircrafts. Therefore, aircraft maintenance for modern aircrafts often includes performing software updates.

SUMMARY

Embodiments of the disclosed technology reduce the overhead required to load software onto avionics components. The methods and systems described herein advantageously minimize and potentially eliminate the time a technician has to spend manually updating the software (e.g., dataloading) for an airplane during routine maintenance operations.

In one exemplary aspect, a method for improving dataloading in an airplane includes retrieving, from an in-flight entertainment connectivity (IFEC) system, at least one avionics software, wherein the IFEC system comprises a mass storage device comprising a first storage segment and a second storage segment, wherein the first storage segment is a secure storage segment configured to store the at least one avionics software, and wherein the second storage segment is configured to store media content; and loading, using a wireless network converter coupled to a wired legacy port, the at least one avionics software onto a target avionics system.

In another exemplary aspect, a method for improving dataloading in an airplane includes retrieving, from an in-flight entertainment connectivity (IFEC) system, at least one avionics software, wherein the IFEC system comprises a mass storage device comprising a plurality of storage segments, wherein a first storage segment of the plurality of storage segments is a secure storage segment configured to store the at least one avionics software, and wherein a second storage segment of the plurality of storage segments is configured to store media content; selecting, using a multi-position rotary switch, a target avionics system of the airplane; and loading, using a wireless access point (WAP) of the IFEC system that is coupled to a wired legacy port, the at least one avionics software onto the target avionics system.

In yet another exemplary aspect, a method for improving dataloading in an airplane includes logically separating, in a mass storage device of an in-flight entertainment connectivity (IFEC) system, a first storage segment of the mass storage device from a second storage segment of the mass storage device; retrieving, from the first storage segment, at least one avionics software, wherein the first storage segment is a secure storage segment configured to store the at least one avionics software, and wherein the second storage segment is configured to store media content; and loading, using a wireless network converter coupled to a wired legacy port, the at least one avionics software onto a target avionics system.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

To maintain security and functionality, digital computers on airplanes use software updates. Avionics computers were among the first of these computers to have periodic updates performed. Originally, these updates were performed according to a tape loading standard (ARINC 603) that required the use of a portable device having one ARINC 429 output and two inputs. The loading was performed by attaching a cable and a portable tape loader to a 32-pin data loader connector located in the cockpit of the airplane. The location of this connector was in different places in different model airplanes to avoid having a technician crawl around an electrical equipment bay each time he was required to perform a software update. Nevertheless, it was soon recognized that portable tape loaders were slow, large and cumbersome. Thus, a new data loading standard, ARINC 615x, was developed to utilize standard 3½" floppy disks.

The ARINC 615x standard continued to evolve to support an increasing number of Line Replaceable Units (LRUs) on an aircraft. One solution to supporting the higher number of LRUs on an aircraft has been to provide a Portable Data Loader (PDL) connector with a multiple position rotary switch. In some cases, approximately 200 wires populate four circular connectors located on the data loader switch installed on a maintenance panel.

Even with these recent advances, existing methods to load new software to avionics components involve a maintenance technician carrying on an ARINC 615A dataloader, plugging it into a port typically in the flight deck, loading software until completed and verified, and then unplugging and leaving the plane. This is quite a manual procedure, requiring the technician to carry equipment and be on board for the entire process. When all aircraft need to be updated, the touch labor required is significant. Furthermore, the workflow of present-day aircraft software updates is prone to errors to the extensive number of steps that a technician has to go through to load new software on a machine. At the same time, since computers are often updated without being online, there is no easy way of ensuring that a correct, or intended, software functionality was loaded on a target aircraft.

The technology described in the present document may be used to reduce and potentially eliminate the time required for the technician to be on board by taking advantage of existing communications means already installed on the aircraft. Furthermore, the data capacity of the loaders becomes less of an issue because the mass storage need not be portable but is installed in aircraft equipment.

Figure 1A:
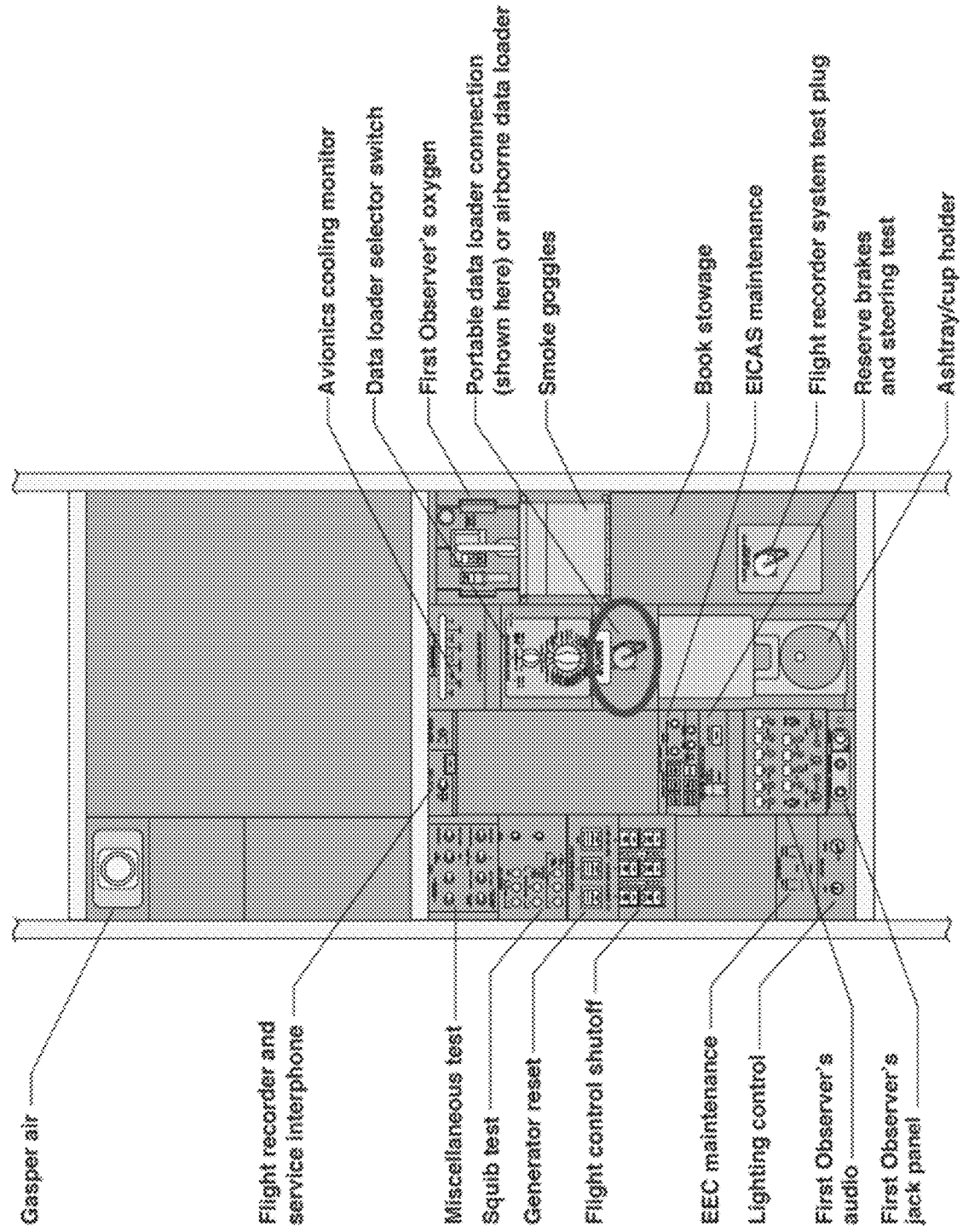
FIG. 1A shows an example of a right side maintenance panel of an aircraft.

Most commercial aircraft include an ARINC 615A dataload port, usually in the flight deck. For example, the dataload port for the 767 is shown in FIG. 1A (and labeled "portable data loader connection"), which shows the right hand maintenance panel of the 767 aircraft. Rather than relying upon portable dataloaders, a wireless-wired Ethernet converter, as described in the embodiments herein, can be plugged into that port and left there. In some embodiments, the converter may be configured to securely connect to an available wireless access point (WAP) using state-of-the-art security (e.g., WPA2-Enteprise security), and then logically connected (and restricted only) to server software implementing the 615A protocol.

Figure 1B:
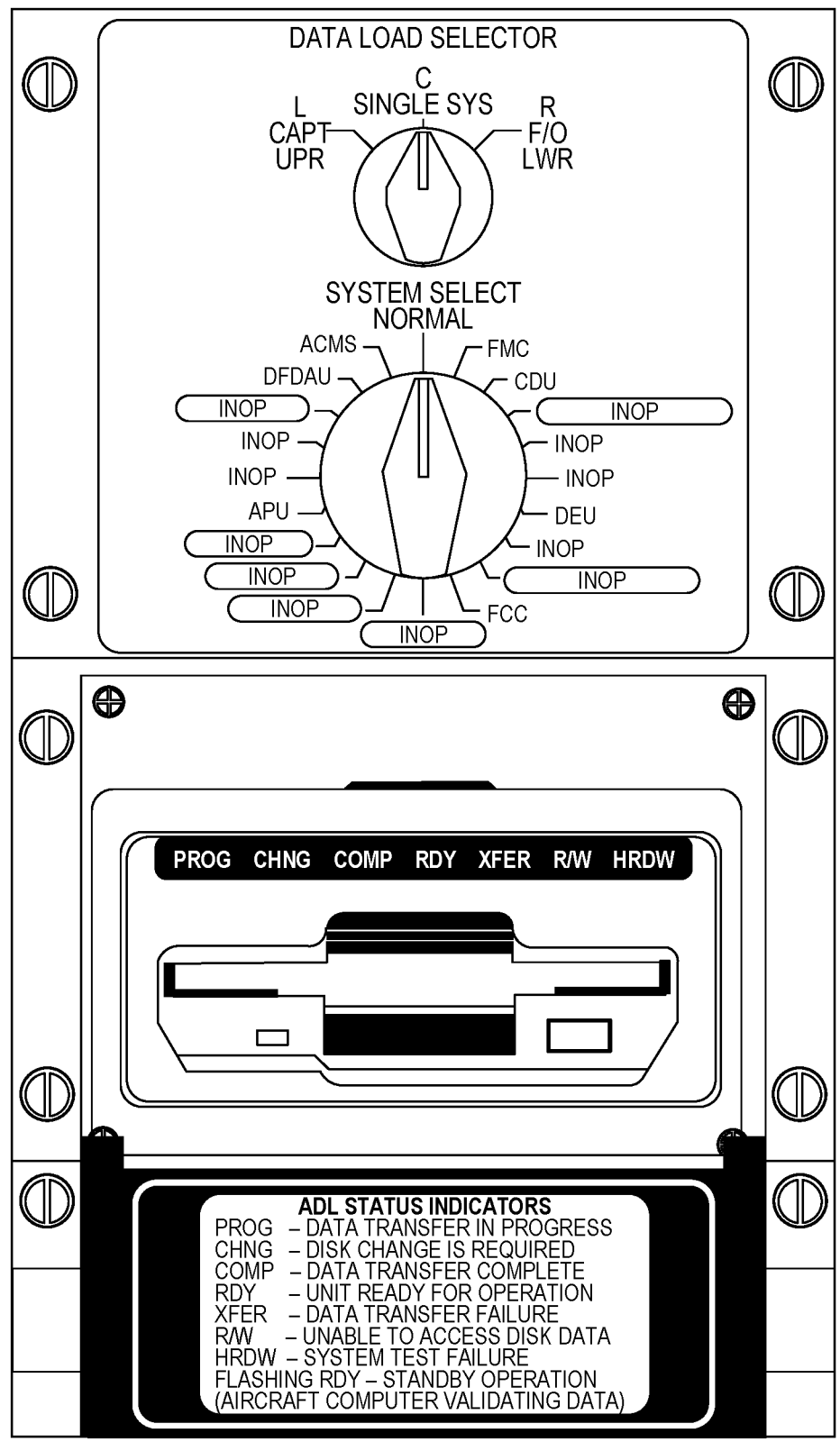
FIG. 1B shows an example of a multi-position rotary switch.

FIG. 1B shows an example of a multi-position rotary switch, which can be used to determine the target avionics components for a specific software update. As described above, the current procedure for software maintenance includes a technician switching the multi-position rotary switch to the correct setting and then loading the appropriate software update. In other examples, the multi-position rotary switch may be electronically controlled, but the technician must still carry a portable dataloader which stores the software updates, and manually updating the software for each avionic component, albeit without turning the multi-position rotary switch.

Figure 2:
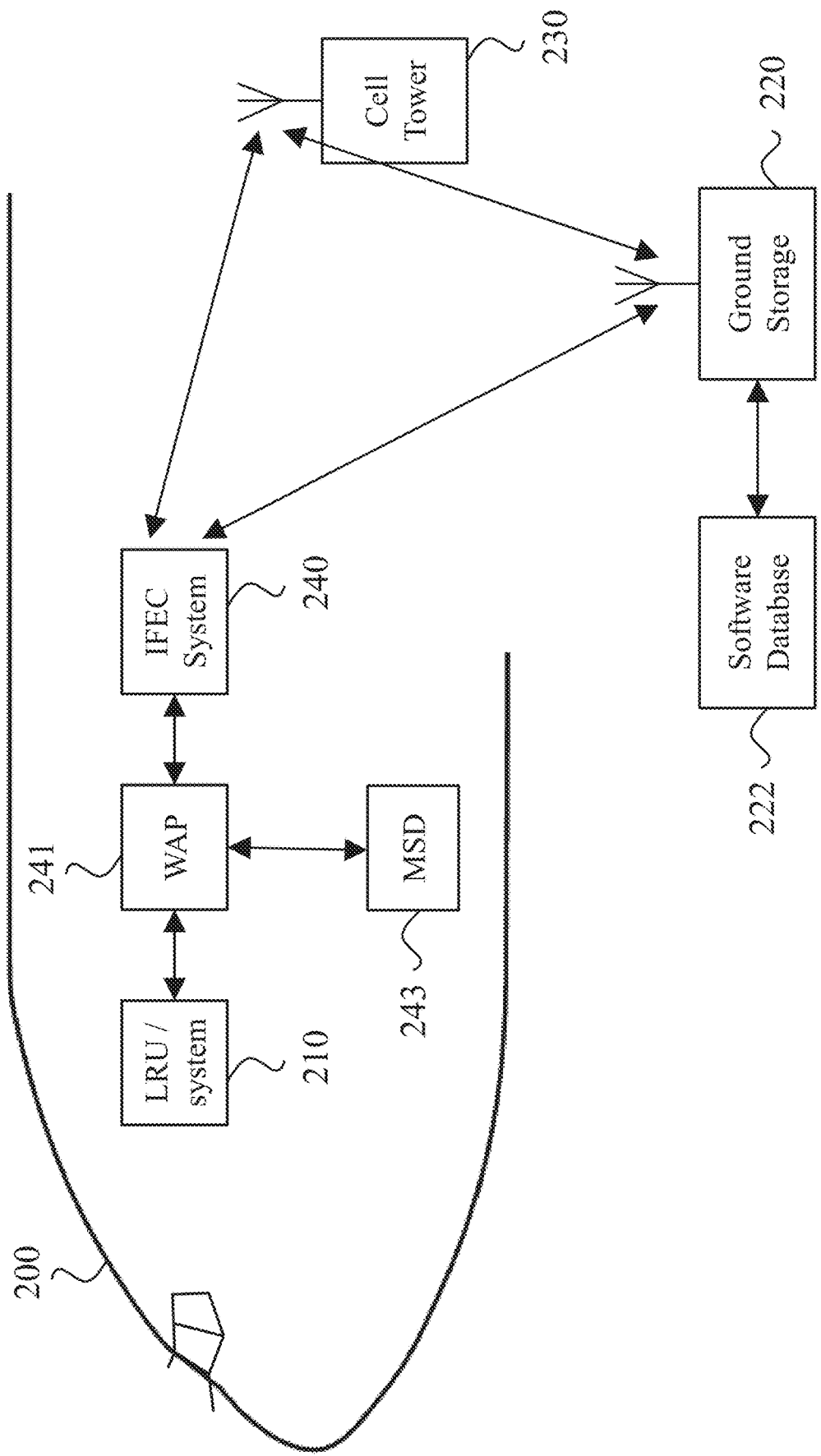
FIG. 2 shows an example architecture of a system that can improve dataloading in an airplane, in accordance with embodiments of the disclosed technology.

FIG. 2 shows an example architecture of a system that can improve dataloading in an airplane, in accordance with embodiments of the disclosed technology. As shown therein, aircraft avionics system 200 includes the IFEC system 240 that is coupled to a wireless access point (WAP) 241 and mass storage device (MSD) 243. In some embodiments, the WAP 241 and MSD 243 may be internal to the IFEC system 240. The IFEC system 240, which stores the software and software updates for all the avionics components, is configured to load them onto the components (e.g., LRU/system 210) via the WAP.

In some embodiments, the IFEC system 240 in the aircraft avionics system 200 receives software and software updates from an ground storage 220. In an example, the IFEC system 240 communicates directly with the ground storage 220 (e.g., using Wi-Fi or a dedicated microwave or free-space optical (FSO) link). In another example, the ground storage 220 communicates with the IFEC system 240 via the cellular network (e.g., cell tower 230).

In some embodiments, the ground storage 220 is coupled to a software database 222, which includes maintenance logs, software configuration information and/or engineering order databases. Prior to the ground storage 220 transmitting the relevant software to the IFEC system 240, the ground storage can validate the software that is about to be pushed to the IFEC system by checking version information, checksums, etc. with the configuration information stored in the software database 222. In other embodiments, the ground storage 220 may check an engineering orders database to determine whether a particular version of the software was previously installed, but not logged correctly.

In some embodiments, IFEC system 240 would function as a virtual 615A dataloader, loading parts that were loaded into its permanent storage as instructed either by an onboard maintenance technician, using either a wired or wireless control panel to operate it, or by a remote maintenance technician. In an example, the software could perform state of the art digital signature checks on the software parts it receives to ensure integrity and authenticity of every part (which may be enough if the software is designated for a system with a high enough design assurance level). In another example, the system into which it loads the part can also check the signature, which could provide higher design assurance than the virtual dataloader offers itself.

In some embodiments, the avionics and operation software that is being loaded from the IFEC system 240 may be stored as encrypted data on the MSD 243. In other embodiments, the ground storage 220 may verify the validity of the software (as described above and by leveraging the software database 222), encrypt it and then transmit the encrypted version of the software to the IFEC system. For example, this scenario may be preferable if the cellular network, via cell tower 230, is being used to transmit avionics software.

In some embodiments, the IFEC system decrypts the software prior to transmitting it to the LRU/system 210 via the WAP 241. Then advantageously ensures backward compatibility since existing LRUs are configured to receive unencrypted data and do not support encryption and decryption capabilities. In other embodiments, the hardware attached to the dataloader port on the LRU (which converts the wired port into a wireless network converter (or wireless port)) may be configured to decrypt incoming traffic, and in this scenario, a secure session may be established between the IFEC system 220 and the LRU/system 210. In an example, a variant of the advanced encryption standard (AES) may be used for the encryption. In another example, an elliptic curve cryptographic technique or other cryptosystem may be used for the encryption.

In some embodiments, the avionics software is stored in a first partition (or storage segment) of the MSD 243 of the IFEC system that is logically separated from a second partition of the MSD that stores the media content for the IFEC system. The logical separation between the two partitions ensures that they can be operated independently. In an example, the first partition with the avionics software may be encrypted, whereas the media content in the second partition remains unencrypted. In another example, the encryption used for the first partition may be stronger than the encryption used for the second partition.

Embodiments of the disclosed technology leverage the hardware and software functionality of the IFEC system to securely store and distribute avionics software, which advantageously reduces the manual oversight required for the process and minimizes any additional hardware (e.g., the PDL) needed for the software dissemination.

In some embodiments, the multi-position rotary switch (e.g., as shown in FIG. 1B) may be operated mechanically in order to correctly route several software instances to the appropriate (sub)systems and modules. In other embodiments, the multi-position rotary switch may be controlled (or operated) electronically, which reduces the touch labor involved. In yet other embodiments, the avionics software may be tagged based on its intended destination, and the multi-position rotary switch can automatically route the software to its intended destination based on the attribute (or tag).

Figure 3:
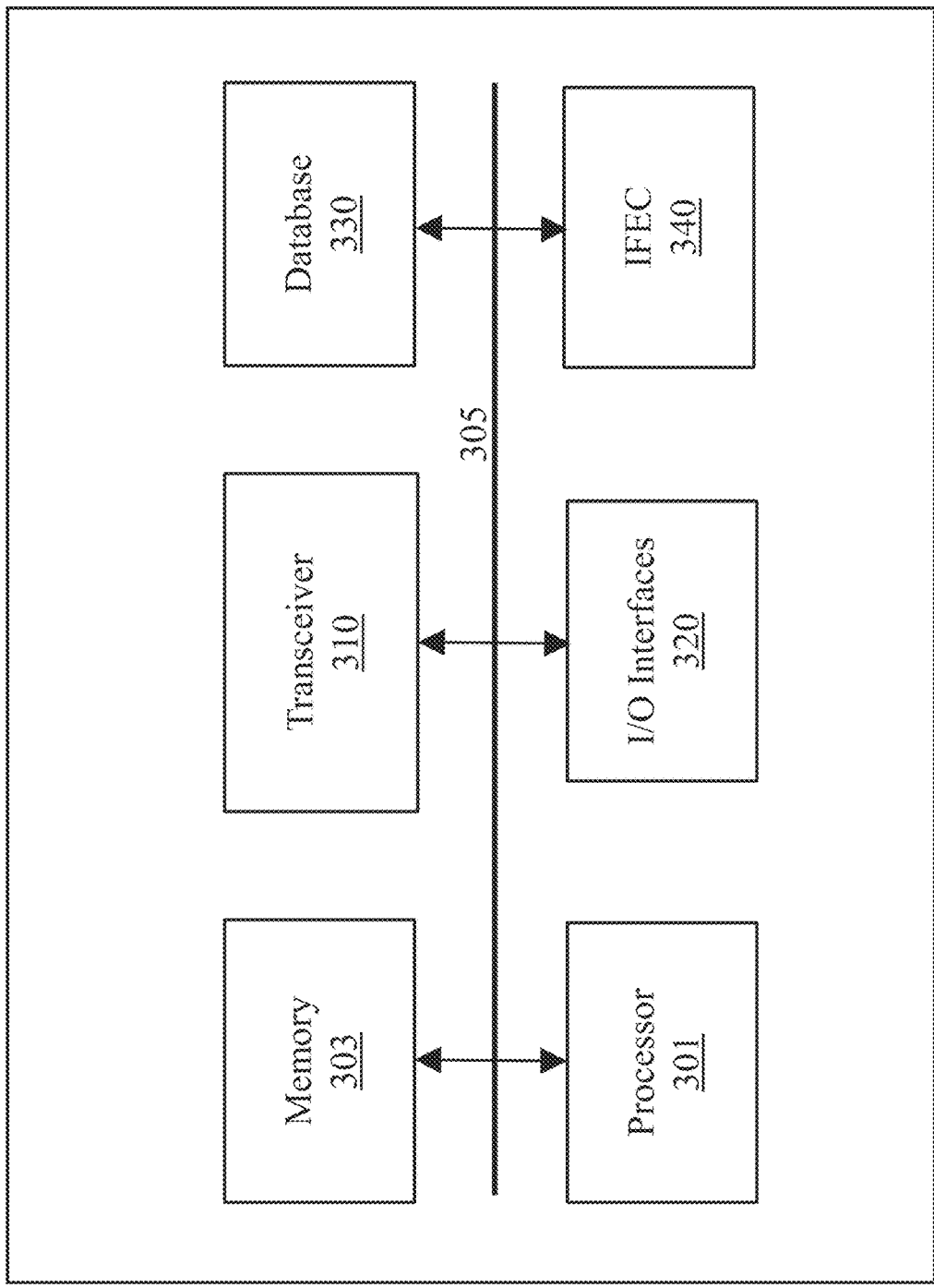
FIG. 3 shows another example architecture of a device that can improve dataloading in an airplane, in accordance with embodiments of the disclosed technology.

FIG. 3 shows an example architecture of a device 300 that can improve dataloading in an airplane. As shown therein, the device may include a processor 301 and a memory 303, which are connected to a bus 305. In an example, the bus 305 may be a Controller Area Network (CAN) bus. In another example, the bus 305 may be an avionics data bus (e.g., ARINC 429, 615, 629 or 664). The processor 301 and memory 303 are further connected, via the bus 305, to at least a transceiver 310, input/output (I/O) interfaces 320, a database 330 and an in-flight entertainment connectivity (IFEC) system 340.

In some embodiments, one or more of the components of the device 300, shown in FIG. 3, may be combined, or implemented independently in another device. For example, the IFEC system 340 may not be directly connected to the bus 305, but may be connected to a different bus (not shown in FIG. 3) that can communicate (either through a wired or wireless connection) with bus 305. For another example, the database 330 or the transceiver 310 may be part of the IFEC system 340, instead of a separate component. For another example, the database 330 could include multiple databases. Alternative embodiments of the architecture shown in FIG. 3, which advantageously improve dataloading in an airplane, include various combinations of the components shown therein.

In some embodiments, the transceiver 310 includes the wireless access point (WAP) of the IFEC system (e.g., WAP 241 in FIG. 2). In other embodiments, the database 330 stores configuration information that is used to validate the software being loaded on the IFEC system (e.g., software database 222 in FIG. 2). In yet other embodiments, the transceiver and the database may be internal components of the IFEC system 340. In yet other embodiments, the memory 303 may include the logically separated storage segments that store the avionics software and media content. In yet other embodiments, the I/O interfaces 320 include hardware and software components that enable the IFEC system to communicate with the external storage system (e.g., ground storage 220 in FIG. 2).

Embodiments of the disclosed technology would advantageously reduce the time required for a technician to be on board: the file copy operation (also referred to as the staging process) can occur remotely and automatically. The aircraft that have the file report to the ground operations center which then schedules a technician to visit the plane. The technician need not preload a portable device nor even carry one out. They need only walk on board and select the preloaded components to load (via his wired or wireless panel).

Figure 4:
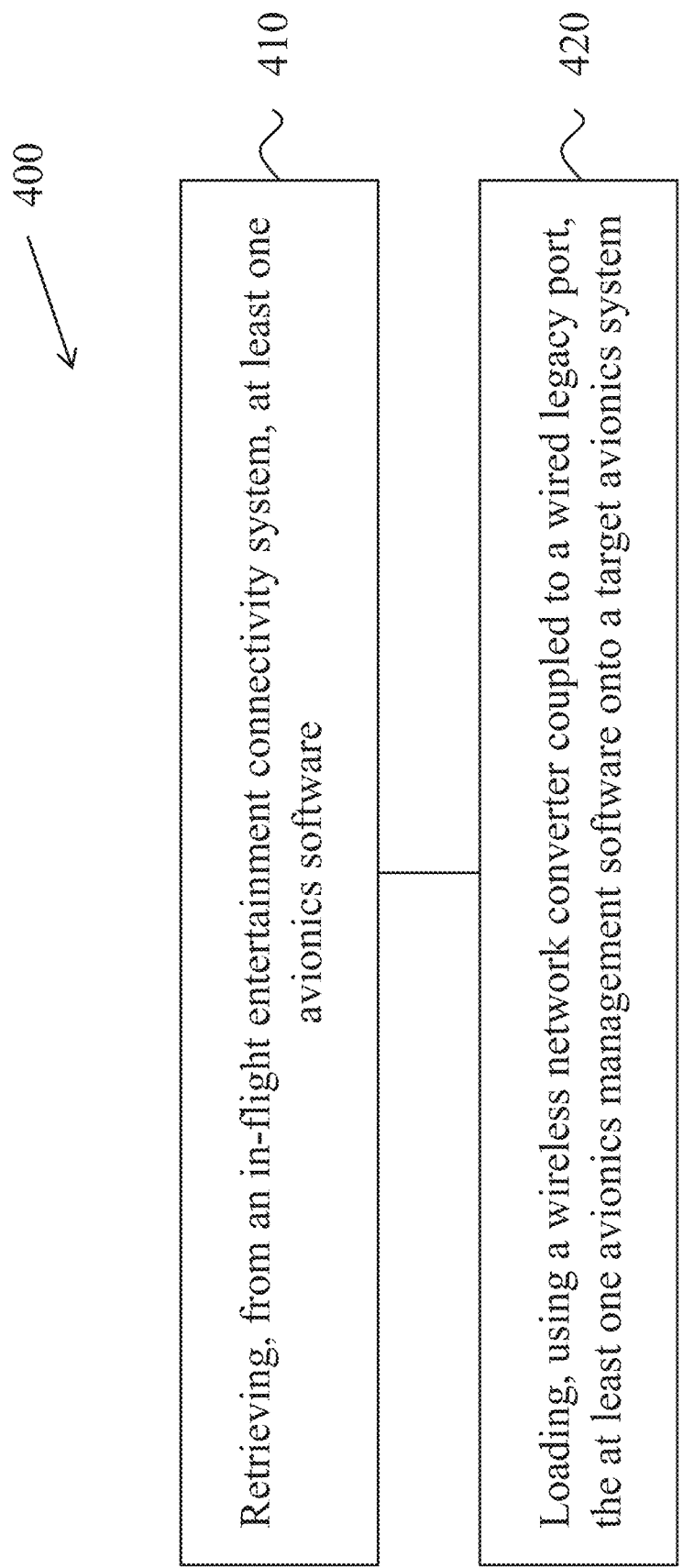
FIGS. 4-6 show flowcharts of example methods for improving dataloading in an airplane, in accordance with embodiments of the disclosed technology.

FIG. 4 shows a flowchart of an example method 400 for improving dataloading in an airplane, in accordance with embodiments of the disclosed technology. The method 400 includes, at operation 410, retrieving, from an in-flight entertainment connectivity (IFEC) system, at least one avionics software. In some embodiments, the IFEC system comprises a mass storage device comprising a first storage segment and a second storage segment, wherein the first storage segment is a secure storage segment configured to store the at least one avionics software, and wherein the second storage segment is configured to store media content.

The method 400 includes, at operation 420, loading, using a wireless network converter coupled to a wired legacy port, the at least one avionics software onto a target avionics system.

In some embodiments, the method 400 further includes the operation of selecting the target avionics system based on mechanical control of a multi-position rotary switch.

In some embodiments, the at least one avionics software comprises an attribute, and the method 400 further includes the operation of selecting the target avionics systems based on the attribute and electronic control of a multi-position rotary switch, the electronic control being configured to bypass mechanical control of the multi-position rotary switch.

In some embodiments, the secure storage segment comprises an encrypted virtual disk that uses a variant of an advanced encryption standard (AES).

In some embodiments, the wired legacy port comprises an ARINC 615A dataload port, and wherein the wireless network converter is a wireless access point (WAP) of the IFEC system.

In some embodiments, the method 400 further includes the operations of identifying, based on a maintenance log or an engineering order database, the at least one avionics software, and updating, subsequent to the loading, the maintenance log.

In some embodiments, the maintenance log comprises a software version of the at least one avionics software, a timestamp associated with the loading, or one or more configuration details associated with a wireless access point (WAP) of the IFEC system.

In some embodiments, the first storage segment is logically separated from the second storage segment.

In some embodiments, the loading the at least one avionics software comprises the wireless network converter emulating a dataloading capability. For example, the wireless network converter emulates the functionality of the ARINC 615A dataloader (or more generally, any legacy wired dataloader), which is typically plugged into a wired port in the flight deck.

Figure 5:
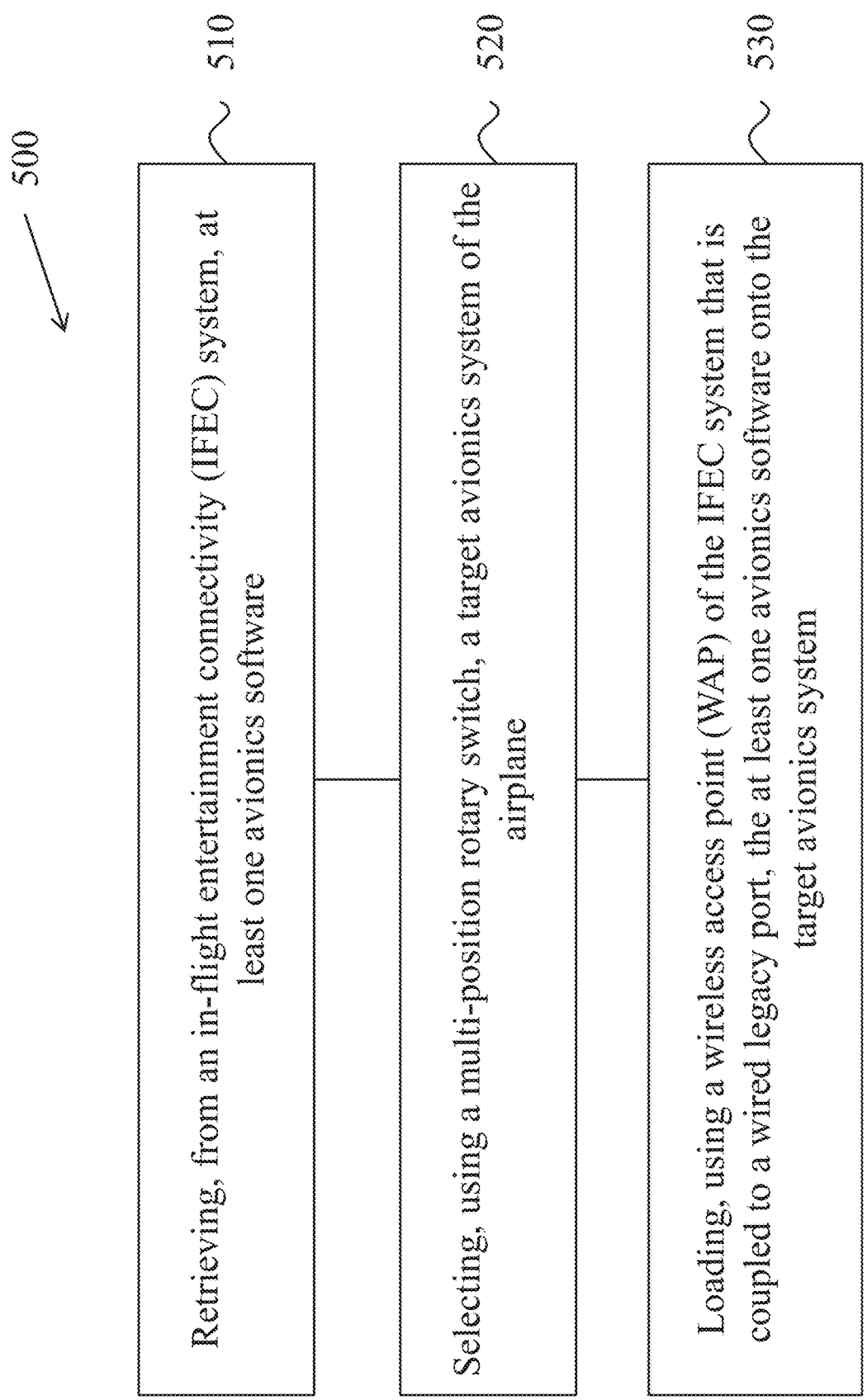

FIG. 5 shows a flowchart of an example method 500 for improving dataloading in an airplane, in accordance with embodiments of the disclosed technology. The method 500 includes, at operation 510, retrieving, from an in-flight entertainment connectivity (IFEC) system, at least one avionics software. In some embodiments, the IFEC system comprises a mass storage device comprising a plurality of storage segments, wherein a first storage segment of the plurality of storage segments is a secure storage segment configured to store the at least one avionics software, and wherein a second storage segment of the plurality of storage segments is configured to store media content.

The method 500 includes, at operation 520, selecting, using a multi-position rotary switch, a target avionics system of the airplane.

The method 500 includes, at operation 530, loading, using a wireless access point (WAP) of the IFEC system that emulates a dataloading capability of wired legacy port, the at least one avionics software onto the target avionics system.

In some embodiments, a functionality of the multi-position rotary switch is based on a type of the airplane.

In some embodiments, the first storage segment is logically separated from the second storage segment.

In some embodiments, selecting the target avionics systems is based on mechanical control of the multi-position rotary switch.

In some embodiments, the at least one avionics software comprises an attribute, selecting the target avionics systems is based on the attribute and electronic control of the multi-position rotary switch, and the electronic control is configured to bypass mechanical control of the multi-position rotary switch.

In some embodiments, the secure storage segment comprises an encrypted virtual disk that uses a variant of an advanced encryption standard (AES).

In some embodiments, loading the at least one avionics software comprises the wireless network converter emulating a dataloading capability.

Figure 6:
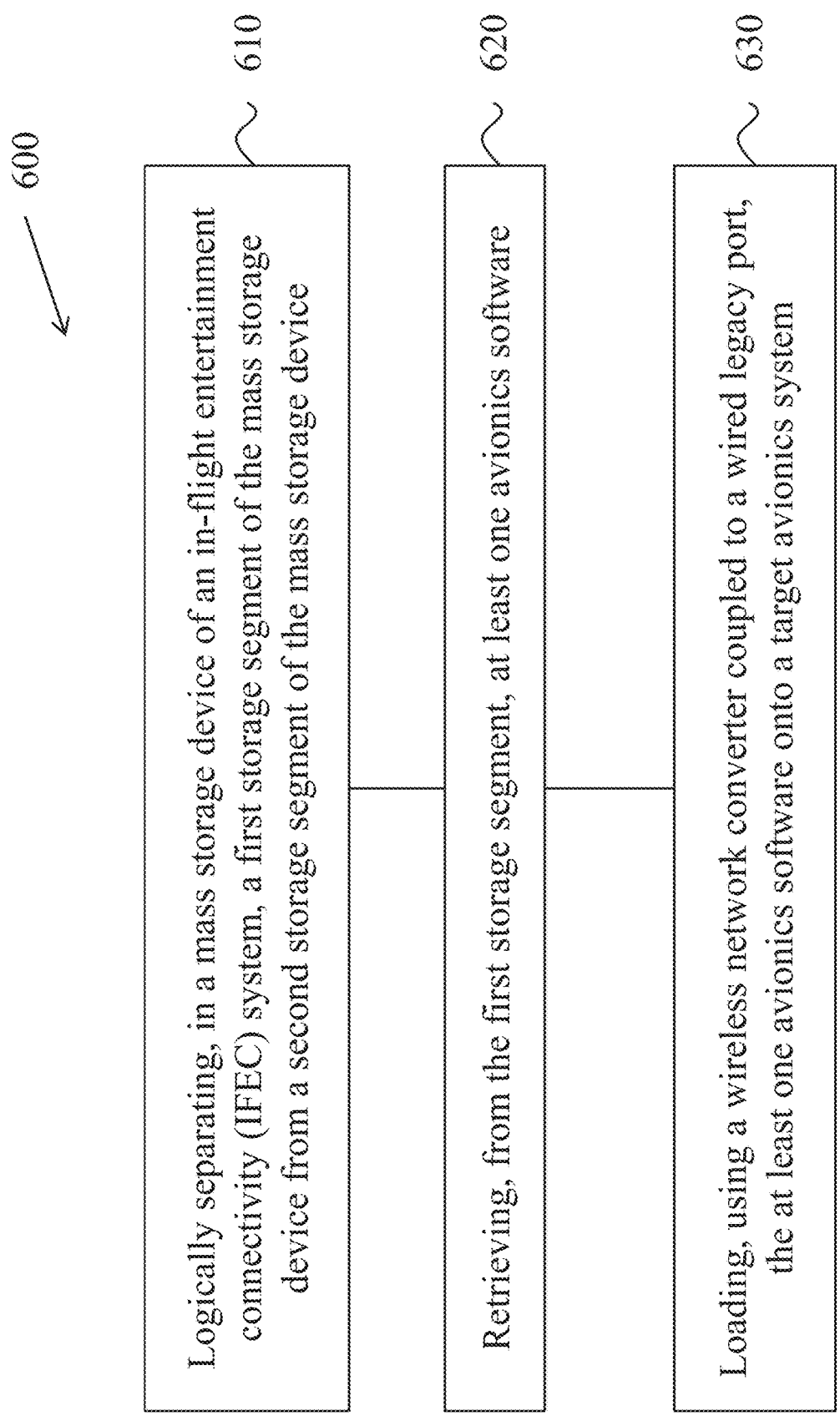

FIG. 6 shows a flowchart of an example method 600 for improving dataloading in an airplane, in accordance with embodiments of the disclosed technology. The method 600 includes, at operation 610, logically separating, in a mass storage device of an in-flight entertainment connectivity (IFEC) system, a first storage segment of the mass storage device from a second storage segment of the mass storage device.

The method 600 includes, at operation 620, retrieving, from the first storage segment, at least one avionics software. In some embodiments, the first storage segment is a secure storage segment configured to store the at least one avionics software, and wherein the second storage segment is configured to store media content.

The method 600 includes, at operation 630, loading, using a wireless network converter coupled to a wired legacy port, the at least one avionics software onto a target avionics system.

In some embodiments, the method 600 further includes the operation of checking, based on a software database coupled to the IFEC system, a configuration of the at least one avionics software, wherein the loading is based on a validity of the checking.

In some embodiments, the secure storage segment comprises an encrypted virtual disk that uses a variant of an advanced encryption standard (AES).

In some embodiments, the method 600 further includes the operations of identifying, based on a maintenance log or an engineering order database, the at least one avionics software, and updating, subsequent to the loading, the maintenance log.

In some embodiments, the wireless network converter is a wireless access point (WAP) of the IFEC system, and wherein the maintenance log comprises a software version of the at least one avionics software, a timestamp associated with the loading, or one or more configuration details associated with the WAP.

In some embodiments, the wired legacy port comprises an ARINC 615A dataload port, and wherein the wireless network converter corresponds to a wireless access point (WAP) of the IFEC system.

In some embodiments, the instructions for loading the at least one avionics software comprise the wireless network converter emulating a dataloading capability.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A method for improving dataloading in an airplane, comprising:

logically separating, in a mass storage device of an in-flight entertainment connectivity (IFEC) system, a first storage segment of the mass storage device from a second storage segment of the mass storage device, wherein the logically separating the first storage segment from the second storage segment comprises (a) configuring the first storage segment differently than the second storage segment and (b) operating the first storage segment independently from the second storage segment;

receiving, by the first storage segment of the mass storage device of the IFEC system, at least one encrypted avionics software;

retrieving, from the first storage system, the at least one encrypted avionics software, wherein the first storage segment is a secure storage segment configured to store the at least one encrypted avionics software, and wherein the second storage segment is configured to store media content;

decrypting the at least one encrypted avionics software to generate at least one decrypted avionics software; and loading, using a wireless network converter coupled to a wired legacy port, the at least one decrypted avionics software onto a target avionics system.

2. The method of claim 1, further comprising:

selecting the target avionics system based on mechanical control of a multi-position rotary switch.

3. The method of claim 1, wherein the at least one decrypted avionics software comprises an attribute, and wherein the method further comprises:

selecting the target avionics systems based on the attribute and electronic control of a multi-position rotary switch, wherein the electronic control is configured to bypass mechanical control of the multi-position rotary switch.

4. The method of claim 1, wherein the secure storage segment comprises an encrypted virtual disk that uses a variant of an advanced encryption standard (AES).

5. The method of claim 1, wherein the wired legacy port comprises an ARINC 615A dataload port, and wherein the wireless network converter is a wireless access point (WAP) of the IFEC system.

6. The method of claim 1, further comprising:

identifying, based on a maintenance log or an engineering order database, the at least one decrypted avionics software; and updating, subsequent to loading and verification thereof, the maintenance log.

7. The method of claim 6, wherein the maintenance log comprises a software version of the at least one decrypted avionics software, a timestamp associated with the loading, or one or more configuration details associated with a wireless access point (WAP) of the IFEC system.

8. The method of claim 1, wherein the loading the at least one decrypted avionics software comprises the wireless network converter emulating a dataloading capability.

9. The method of claim 1, wherein the at least one encrypted avionics software is received from a ground storage via a free space optical (FSO) link.

10. A device for improving dataloading in an airplane, comprising:

a processor and a memory including instructions stored thereupon, wherein the instructions upon execution by the processor cause the processor to:

logically separate, in a mass storage device of an in-flight entertainment connectivity (IFEC) system, a first storage segment of the mass storage device from a second storage segment of the mass storage device, wherein logically separating the first storage segment from the second storage segment comprises (a) configuring the first storage segment differently than the second storage segment and (b) operating the first storage segment independently from the second storage segment;

receive, by the first storage segment of the mass storage device of the IFEC system, at least one encrypted avionics software;

retrieve, from the first storage system, the at least one encrypted avionics software, wherein the first storage segment of the plurality of storage segments is a secure storage segment configured to store the at least one encrypted avionics software, and wherein the second storage segment of the plurality of storage segments is configured to store media content;

select, using a multi-position rotary switch, a target avionics system of the airplane;

decrypt the at least one encrypted avionics software to generate at least one decrypted avionics software; and load, using a wireless access point (WAP) of the IFEC system that is coupled to a wired legacy port, the at least one decrypted avionics software onto the target avionics system.

11. The device of claim 10, wherein a functionality of the multi-position rotary switch is based on a type of the airplane.

12. The device of claim 10, wherein selecting the target avionics systems is based on mechanical control of the multi-position rotary switch.

13. The device of claim 10, wherein the at least one decrypted avionics software comprises an attribute, wherein selecting the target avionics systems is based on the attribute and electronic control of the multi-position rotary switch, and wherein the electronic control is configured to bypass mechanical control of the multi-position rotary switch.

14. The device of claim 10, wherein the secure storage segment comprises an encrypted virtual disk that uses a variant of an advanced encryption standard (AES).

15. The device of claim 10, wherein loading the at least one decrypted avionics software comprises the wireless network converter emulating a dataloading capability.

16. A non-transitory computer-readable storage medium having instructions stored thereupon for improving dataloading in an airplane, comprising:

instructions for logically separating, in a mass storage device of an in-flight entertainment connectivity (IFEC) system, a first storage segment of the mass storage device from a second storage segment of the mass storage device, wherein the instructions for logically separating the first storage segment from the second storage segment comprises (a) instructions for configuring the first storage segment differently than the second storage segment and (b) instructions for operating the first storage segment independently from the second storage segment;

instructions for receiving, by the first storage segment of the mass storage device of the IFEC system, at least one encrypted avionics software;

instructions for retrieving, from the first storage segment, the at least one encrypted avionics software, wherein the first storage segment is a secure storage segment configured to store the at least one encrypted avionics software, and wherein the second storage segment is configured to store media content;

instructions for decrypting the at least one encrypted avionics software to generate at least one decrypted avionics software; and instructions for loading, using a wireless network converter coupled to a wired legacy port, the at least one decrypted avionics software onto a target avionics system.

17. The storage medium of claim 16, further comprising:

instructions for checking, based on a software database coupled to the IFEC system, a configuration of the at least one decrypted avionics software, wherein the loading is based on a validity of the checking.

18. The storage medium of claim 16, wherein the secure storage segment comprises an encrypted virtual disk that uses a variant of an advanced encryption standard (AES).

19. The storage medium of claim 16, further comprising:
instructions for identifying, based on a maintenance log or an engineering order database, the at least one decrypted avionics software; and
instructions for updating, subsequent to the loading, the maintenance log.

20. The storage medium of claim 19, wherein the wireless network converter a wireless access point (WAP) of the IFEC system, and wherein the maintenance log comprises a software version of the at least one decrypted avionics software, a timestamp associated with the loading, or one or more configuration details associated with the WAP.

21. The storage medium of claim 16, wherein the wired legacy port comprises an ARINC 615A dataload port, and wherein the wireless network converter corresponds to a wireless access point (WAP) of the IFEC system.

22. The storage medium of claim 16, wherein the instructions for loading the at least one decrypted avionics software comprise the wireless network converter emulating a dataloading capability.

23. The storage medium of claim 16, wherein the at least one encrypted avionics software is received from a ground storage via a free space optical (FSO) link.

* * * * *